United States Patent
Renard et al.

(10) Patent No.: US 12,137,394 B2
(45) Date of Patent: Nov. 5, 2024

(54) MESSAGE TRANSMISSION IN A MULTI-TERMINAL CONTEXT

(71) Applicant: ORANGE, Issy les Moulineaux (FR)

(72) Inventors: Vladimir Renard, Chatillon (FR); Christophe Suart, Chatillon (FR)

(73) Assignee: ORANGE, Issy les Moulineaux (FR)

( * ) Notice: Subject to any disclaimer, the term of this patent is extended or adjusted under 35 U.S.C. 154(b) by 448 days.

(21) Appl. No.: 17/601,301

(22) PCT Filed: Apr. 1, 2020

(86) PCT No.: PCT/EP2020/059199
§ 371 (c)(1),
(2) Date: Oct. 4, 2021

(87) PCT Pub. No.: WO2020/201320
PCT Pub. Date: Oct. 8, 2020

(65) Prior Publication Data
US 2022/0182800 A1    Jun. 9, 2022

(30) Foreign Application Priority Data
Apr. 5, 2019   (FR) ..................................... 1903652

(51) Int. Cl.
*H04W 4/14* (2009.01)
*H04W 56/00* (2009.01)

(52) U.S. Cl.
CPC .......... *H04W 4/14* (2013.01); *H04W 56/001* (2013.01)

(58) Field of Classification Search
CPC ........ H04W 4/14; H04W 56/001; H04W 4/12
USPC ......................................................... 455/466
See application file for complete search history.

(56) References Cited

FOREIGN PATENT DOCUMENTS

| EP | 613102 A1 * | 8/1994 | ............. G06K 15/00 |
| EP | 1613102 A1 | 1/2006 | |
| FR | 2865092 A1 * | 7/2005 | ............. H04W 4/12 |
| FR | 3053560 A1 | 1/2018 | |

OTHER PUBLICATIONS

English translation of the Written Opinion of the International Searching Authority dated May 8, 2020 for corresponding International Application No. PCT/EP2020/059199, filed Apr. 1, 2020.

(Continued)

*Primary Examiner* — Tanmay K Shah
(74) *Attorney, Agent, or Firm* — David D. Brush; Westman, Champlin and Koehler, P.A.

(57) ABSTRACT

A method, a gateway, a synchronization server, a corresponding terminal and a system for transmitting a message intended for a first terminal, referred to as a destination terminal, from a second terminal, referred to as a source terminal, to at least one third terminal, referred to as an associated terminal, sharing a same identifier with the destination terminal. The method includes, following reception of the message by a gateway, transmitting from the gateway to a synchronization server the message by using a first signaling protocol and recovering by the at least one associated terminal the message intended for the destination terminal from the synchronization server by using a first synchronization message.

10 Claims, 3 Drawing Sheets

(56) References Cited

OTHER PUBLICATIONS

International Search Report dated Apr. 30, 2020 for corresponding International Application No. PCT/EP2020/059199, Apr. 1, 2020.
Written Opinion of the International Searching Authority dated Apr. 30, 2020 for corresponding International Application No. PCT/EP2020/059199, filed Apr. 1, 2020.
International Search Report dated Apr. 30, 2021 for International Application No. PCT/EP2020/059200, filed Apr. 1, 2020.
Written Opinion of the International Searching Authority dated Apr. 30, 2021 for International Application No. PCT/EP2020/059200, filed Apr. 1, 2020.
English translation of the Written Opinion of the International Searching Authority dated May 8, 2020 for corresponding International Application No. PCT/EP2020/059200, filed Apr. 1, 2020.
"Universal Mobile Telecommunications System (UMTS) ; LTE; 3GPP Generic User Profile (GUP) ; Architecture (Stage 2) (3GPP TS 23.240 version 15.0.0 Release 15)", vol. 3GPP SA, No. V15.0.0, Jun. 29, 2018 (Jun. 29, 2018), p. 1-36, ETSI Technical Specification, European Telecommunications Standards Institute (ETSI), 650, Route Des Lucioles; F-06921 Sophia-Antipolis, France; Retrieved from the Internet: URL: http://www.etsi.org/deliver/etsi_ts/123200_123299/123240/15.00.00_60/ts_123240v150000p.pdf, XP014329533.
"Digital cellular telecommunications system (Phase 2+) (GSM) ; Universal Mobile Telecommunications System (UMTS) ; Technical realization of the Short Message Service (SMS) (3GPP TS 23.040 version 15.2.0 Release 15) ", vol. 3GPP CT, No. V15.2.0, 27 Sep. 2018 (Sep. 27, 2018), p. 1-219, ETSI Technical Spec. EP Telecomm. Standards Institute (ETSI), 650, Route Des Lucioles ; F-06921 Sophia-Antipolis, France; Retrieved from the Internet URL: http://www.etsi.org/deliver/etsi_ts/123000_123099/123040/15.02.00_60/ts_123040v150200p.pdf, XP014329467.

\* cited by examiner

Fig. 5
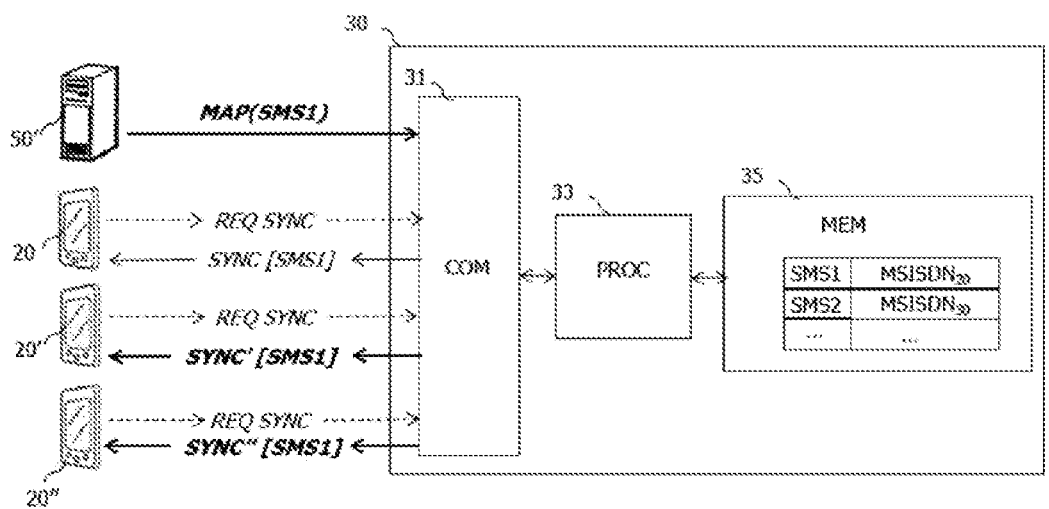
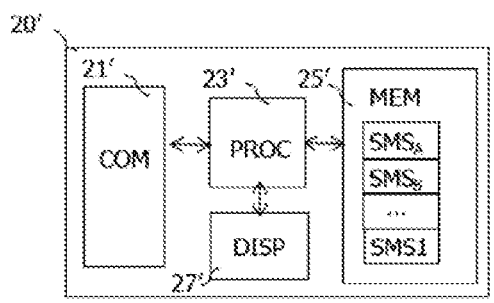
Fig. 6

MESSAGE TRANSMISSION IN A MULTI-TERMINAL CONTEXT

CROSS-REFERENCE TO RELATED APPLICATIONS

This Application is a Section 371 National Stage Application of International Application No. PCT/EP2020/059199, filed Apr. 1, 2020, the content of which is incorporated herein by reference in its entirety, and published as WO 2020/201320 on Oct. 8, 2020, not in English.

FIELD OF THE DISCLOSURE

The present invention relates to the transmission of messages in a multi-terminal context, and in particular to the transmission of SMS messages in such a context.

BACKGROUND OF THE DISCLOSURE

The SMS messaging system (SMS standing for "Short Message Service") was developed years ago, to allow short text messages to be sent between mobile terminals, by means of the signaling messages used in second generation mobile communication networks at the time. This system was standardized through the 3GPP standards TS 23.240 and TS 23.040 and has met with immense success to the point that it is still widely used today.

However, the SMS messaging system as standardized was designed from the outset for the transmission of messages from a single sender mobile terminal to a single recipient mobile terminal.

However, so-called "multi-terminal" systems, in which a set of terminals share the same identifier, which is common to all the terminals of a given system, have recently been developed. This common identifier may be the telephone number natively linked to one of the terminals of the system. This common identifier may also be a number not natively linked to one of the terminals of the system, such a number then possibly being called an "extra-number" or even "virtual number", which is typically a new number assigned by the operator, not linked to a particular terminal or SIM card. This common identifier may be used by a user, with any one of the terminals of the system, to make or receive a telephone call using any one of these terminals by means of this identifier.

The SMS messaging system described above turns out not to be completely compatible with this type of "multi-device" systems.

In particular, in the case of SMS messages received by a mobile terminal belonging to a set of mobile terminals associated within a multi-terminal system, if the SMS system such as currently standardized is applied, each terminal of the multi-terminal system terminal behaves completely independently of the other terminals of this system, without taking into account the existence of other terminals which are nevertheless associated with it within the multi-terminal system.

Patent application EP 1 613 102 A1 describes a system for controlling the delivery of short messages, in which it is possible to flexibly program, by means of instructions stored in a database of a network entity, the redirection, copy or distribution of short messages sent by a source terminal and received by this network entity.

However, the distribution, such as envisaged in this system, of short messages to a plurality of recipient terminals is based on using distinct MSISDN identifiers for each recipient terminal, in order to be able to address the short message to be distributed to each of these recipient terminals using a conventional messaging network architecture. Such a system therefore proves to be incompatible with sending messages to a "multi-terminal" system as described above, since the terminals of such a "multi-terminal" system share the same common identifier while the control system of patent application EP 1 613 102 A1 requires distinct identifiers for each terminal to which to distribute a short message.

Patent application FR 3 053 560 A1 for its part describes a message redirection system resulting from the modification of a conventional SMS messaging system, in which a database is added making it possible to redirect a message intended for a first telephone line to a distinct second telephone line and, if this redirection fails, to then redirect this message to the first telephone line.

However, the principle of this system is based on the redirection of a message to a single terminal at a time, and therefore does not in any way envision the problem described above linked to the transmission of messages to the terminals of a "multi-terminal" system. In addition, here again, each terminal necessarily being identified with a distinct telephone line in the system of this patent application, this system proves incompatible with sending messages to a "multi-terminal" system in which several terminals share the same common identifier.

SUMMARY

The present invention therefore remedies these drawbacks.

To this end a method is provided for transmitting a message intended for a first terminal, called the recipient terminal, from a second terminal, called the source terminal, to at least one third terminal, called the associated terminal, sharing the same identifier with the recipient terminal, comprising the following steps, following the reception of the message by a routing gateway: transmission, from the routing gateway to a synchronization server, of the message by means of a first signaling protocol and retrieval, by said at least one associated terminal, of the message intended for the recipient terminal from the synchronization server by means of a first synchronization message.

In one advantageous embodiment, the method further comprises determination, by the routing gateway, of the membership of the recipient terminal to a multi-terminal system comprising the recipient terminal and said at least one associated terminal, the retrieval step taking place only in the event of a positive result of said determination.

In one advantageous embodiment, the method further comprises transmission, from the routing gateway to the recipient terminal, of the message by means of a second signaling protocol.

According to one particular embodiment, the transmission, from the routing gateway to the recipient terminal, of the message by means of a second signaling protocol is carried out only if it is determined, in the determining step, that the recipient terminal does not belong to a multi-terminal system.

According to one particular embodiment, the method further comprises the retrieval, by said recipient terminal, of the message intended for the recipient terminal from the synchronization server by means of a second synchronization message. In particular, the retrieval, by said recipient terminal, of the message intended for the recipient terminal from the synchronization server by means of a second synchronization message may be carried out only if it is determined that the message has not been transmitted from the routing gateway to the recipient terminal by means of a signaling message.

According to one particular embodiment, the method further comprises the storage, by the synchronization server, of the message following its reception from the routing gateway.

In one particular embodiment, the message intended for the recipient terminal is a message in SMS format. In one particular embodiment, the first and/or the second synchronization message is a message conforming to a protocol among the IMAP, JMAP, OMA DS or OMA NMS protocols. In one particular embodiment, the first and/or the second signaling protocol is a protocol among the SIP, MAP and NAS protocols.

Provision is also made for a routing gateway comprising a communication module capable of receiving a message intended for a first terminal, called the recipient terminal, according to a first signaling protocol and a processing module, configured to insert the message into a signaling message to be transmitted to a synchronization server in order to allow at least one second terminal, called the associated terminal, sharing an identifier with the recipient terminal, to retrieve said message from said synchronization server.

According to one particular embodiment, this processing module is further configured to instruct the communication module to transmit said message to the recipient terminal by means of a signaling message according to a second signaling protocol.

According to one particular embodiment, this processing module is further configured to inhibit the transmission of said message by the communication module to the recipient terminal.

Provision is also made for a synchronization server comprising a communication module capable of receiving a signaling message according to a first signaling protocol, this signaling message containing a message intended for a first terminal, called the recipient terminal, and a processing module configured to insert the received message into at least one first synchronization message to be transmitted, by the communication module, to at least one second terminal, called the associated terminal, sharing an identifier with said recipient terminal.

According to one particular embodiment, the processing module is further configured to insert the message into a second synchronization message to be transmitted, by the communication module, to said recipient terminal.

Provision is also made for a terminal, able to share the same identifier with another terminal, called the recipient terminal, comprising a processing module, a communication module configured to receive messages intended for said terminal, and a storage module configured to store said messages intended for said terminal with a view to presenting it to a user. In this terminal, the communication module is further configured to receive, from a synchronization server, a synchronization message containing a message intended for the recipient terminal, and the processing module is configured to extract, from the received synchronization message, the message intended for the recipient terminal and to deliver said message to the storage module in order to store said message therein with a view to presenting it to a user with the messages intended for said terminal.

Provision is also made for a system for transmitting a message intended for a first terminal, called the recipient terminal, from a second terminal, called the source terminal, to at least one third terminal, called the associated terminal, sharing the same identifier with the recipient terminal, comprising a routing gateway and a synchronization server such as presented above. In one embodiment, this system further comprises at least one terminal such as presented above.

BRIEF DESCRIPTION OF THE DRAWINGS

Other features and advantages of the invention will become more clearly apparent upon reading the following description of particular embodiments, provided by way of simple illustrative and nonlimiting examples, and the appended drawings, in which:

FIG. 5 illustrates a synchronization server according to one embodiment of the present invention; and FIG. 6 illustrates a terminal according to one embodiment of the present invention.

DETAILED DESCRIPTION OF ILLUSTRATIVE EMBODIMENTS

Figure 1:
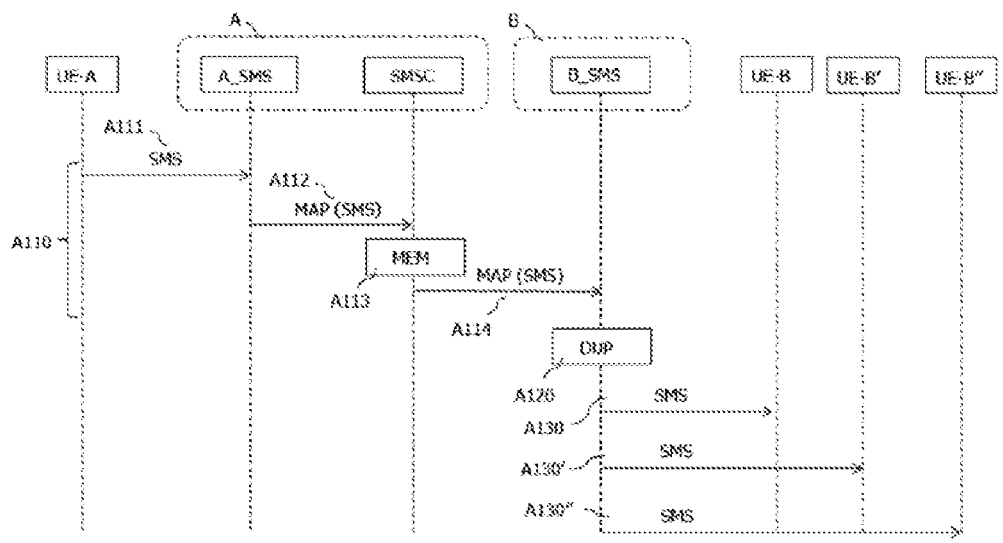
FIG. 1 schematically shows the architecture provided for the transmission of SMS message, such as currently standardized.

First of all, reference is made to FIG. 1, which schematically illustrates an architecture, based on existing 3GPP standards, that may currently be envisioned to allow the transmission of SMS messages from a sender mobile terminal UE-A to a recipient mobile terminal UE-B.

In particular, once a message SMS intended for a recipient mobile terminal UE-B has been entered by a user on the mobile terminal UE-A, the mobile terminal UE-A transmits (step A110) this message SMS to a routing gateway belonging to the communication network B to which the recipient terminal is attached, so that this gateway may address this message to this terminal UE-B as soon as the latter becomes reachable.

Such a transmission is typically broken down into a first transmission of the message SMS according to a SIP (Session Initiation Protocol) or NAS (Non Access Stratum) signaling protocol, from the terminal UE-A to a routing gateway A_SMS (which is typically an IP-SM-GW gateway in the case of a 4G access network or an MSC node in the case of a 2G or 3G access network) that is assigned to it in the network A to which it is attached (sub-step A111), this gateway then retransmitting this message SMS according to a MAP signaling protocol (MAP standing for Mobile Application Part) to an SMSC network node (SMSC standing for Short Message Service Centre) (substep A112), so that this network node SMSC may store (substep A113) this message SMS with a view to its subsequent retransmission to the network B to which the recipient terminal is subscribed. Subsequently, when the availability of the recipient terminal UE-B is signaled to this network node SMSC, the latter then transmits (sub-step A114) the message SMS to a routing gateway B_SMS of this network B, by means of the MAP signaling protocol (this gateway B_SMS typically being an IP-SM-GW gateway in the case of a 4G access network or an MSC node in the case of a 2G or 3G access network).

If this last routing gateway B_SMS of the network B has been configured beforehand to transmit any message SMS intended for the recipient terminal UE-B to other terminals which are associated with it (here the two terminals UE-B' and UE-B" purely by way of illustration), this routing gateway must then proceed to the duplication (step A120) of this message SMS into as many messages as there are associated terminals, in order to transmit (step A130) this message SMS to the recipient terminal UE-B using a signaling protocol (here the SIP protocol by way of example), to transmit (step A130') the same message SMS to the first associated terminal UE-B', again using a signaling protocol, and to transmit (step A130") the same message SMS to the second associated terminal UE-B", again using a signaling protocol.

As may be seen, this mechanism is particularly tedious and consumes resources in the signaling plane in proportion to the number of associated terminals in question.

Figure 2:
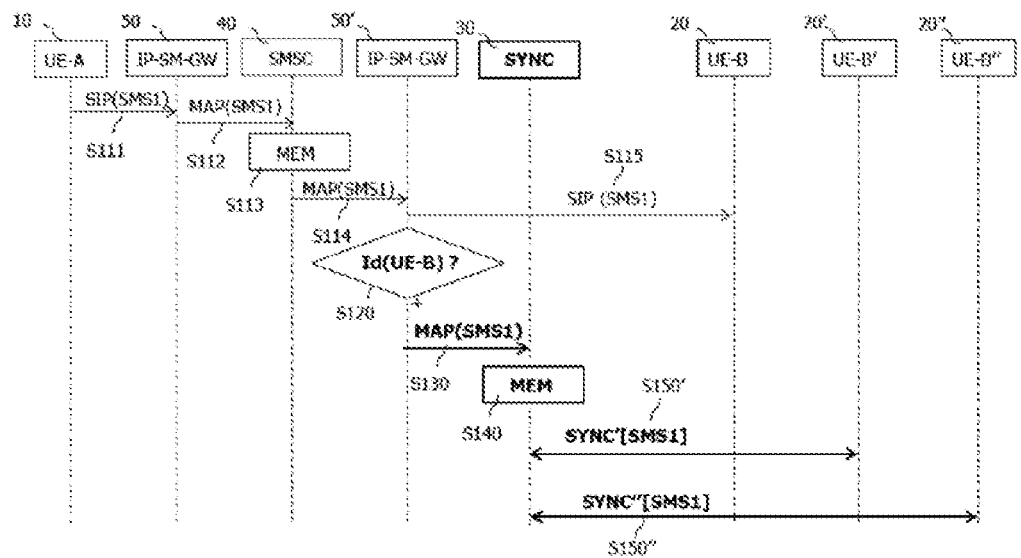
FIG. 2 shows one embodiment of the message transmission method according to the present invention.

Reference is now made to the FIG. 2, which illustrates a message transmission method according to one embodiment of the present invention.

In this embodiment, a first terminal 10, called the source terminal below, wishes to send a message to a second terminal 20, called the recipient terminal below. The terminals 10 and 20 may in particular be mobile terminals, smartphones for example.

The message in question is here illustrated as being a message SMS1, formatted according to the SMS format, but the invention is not limited to this single message format and may be applied to any type of message intended to be transmitted, between terminals, and in particular between mobile terminals, only in the signaling plane.

In the present case, the recipient terminal 20 is associated with at least one other terminal, called the associated terminal, in a communication context called a "multi-terminal context". Here too, it may be a question of a mobile terminal, a smartphone for example.

In such a multi-terminal context, the various associated terminals share the same identifier, also called the common identifier, which may in particular be the same telephone number (i.e. the same MSISDN identifier) serving as a unique identifier in a defined numbering plan, so that the other terminals called by (or recipients of a message coming from) one of the associated terminals see only one and the same identifier, independently of the associated terminal actually used.

Here, FIG. 2 illustrates the case of a multi-terminal system with three associated terminals, in which two other "associated" terminals 20' and 20" are associated with the recipient terminal 20, and therefore share with it one and the same identifier "$MSISDN_{20}$" (in the present case the identifier of the recipient terminal 20), but the invention is not limited to this single case, a number N (with N≥1) of terminals being able to be associated with the recipient terminal 20 within such a system.

The associated terminals within a multi-terminal system may in particular be mobile terminals (smartphones, connected watches, tablets, inter alia), and also other less mobile types of terminals, such as voice assistants, or connected refrigerators, i.e. any terminal connected to the network and capable of sending and receiving messages, possibly by displaying them or by vocalizing them.

In addition to the recipient terminal and the terminals associated with this recipient terminal, this embodiment involves a synchronization server 30, with which the associated terminals 20' and 20" (or even also the recipient terminal 20, as will be seen below) exchange synchronization messages, designated here by "SYNC".

In this regard, client synchronization modules are installed, typically in software form, in the associated terminals 20' and 20" (or also in the recipient terminal 20 as will be seen below) while a synchronization server module, typically in software form, is installed in the synchronization server 30, these modules being synchronized so that the client modules are notified of changes in the content of the server module of the synchronization server, either in real time as soon as such a change takes place, or in non-real time when one of the client modules interrogates the server module in order to learn of any changes that have taken place since the last connection of the client terminal to the server.

Such synchronization messages SYNC conform to a synchronization protocol able to be used between a client module and a server module, which may be the IMAP (for Interactive Message Access Protocol), JMAP (for the Java implementation of the IMAP protocol), OMA DS (Data Synchronization) or OMA NMS (Network Message Storage) protocol, for example. In other words, the terminals 20' and 20" (or even also the terminal 20) synchronize with the synchronization server 30 by exchanging synchronization messages in accordance with a synchronization protocol such as one of the aforementioned protocols, cited by way of example of synchronization protocol.

As will be explained below, the use of such a synchronization server makes it possible to overcome the inability, encountered with the conventional messaging systems described above, to receive a message on the various terminals of a multi-terminal system sharing the same identifier.

In a step (not illustrated) prior to the present method, the terminals 20' and 20" associated with the recipient terminal 20 register with the synchronization server 30, in order to subsequently benefit from the synchronization service managed by this server. In particular, the synchronization server 30 has access to information making it possible to make the link between all the associated terminals, typically an identifier common to all these terminals such as an identifier $MSISDN_{20}$ of the recipient terminal 20, or an extra-number, i.e. a new number, supplied by the operator, and not linked to a particular terminal or SIM card.

When a message SMS1 (here a message in the SMS format) is to be transmitted from the source terminal 10 to the recipient terminal 20, the terminal 10 transmits (step S111) this message SMS1 according to a signaling protocol (here illustrated as being the SIP protocol) to a first routing gateway 50 (here non-limitingly illustrated by an IP-SM-GW gateway) belonging to the network to which the terminal 10 is attached, which retransmits (step S112) this message SMS1 by means of a signaling protocol (here illustrated by the MAP protocol) to a network node 40 (here illustrated by an SMSC node) which stores this message (step S113) before retransmitting it (step S114) to a second routing gateway 50' (here non-limitingly illustrated by an IP-SM-GW gateway) by means of a signaling protocol (illustrated here by the MAP protocol). Such a retransmission may be done immediately (upon receipt of the message) and, if it fails, may be retried periodically until it succeeds, or else be retried once the network node 40 has been notified by the network B of the availability of the recipient terminal 20.

Once the message SMS1 has been received, the second routing gateway 50' then transmits (step S115) this SMS message to the recipient terminal 20, within the network B to which this terminal 20 is attached, according to a signaling protocol that may be the SIP protocol, or a combination of the MAP and NAS protocols (NAS standing for Non-Access Stratum), for example.

After the message SMS1 has been received from the network node 40, and in parallel with sending this message SMS1 to the terminal 20 (i.e. before, during or after sending), the second routing gateway 50' may transmit (step S130) the message SMS1 to the synchronization server 30 according to a signaling protocol, for example the MAP protocol as non-limitingly illustrated in FIG. 2, or even the OMA NMS protocol, among other protocols suitable for the transmission of signaling messages between routing gateway and synchronization server.

To this end, the second routing gateway 50' will have advantageously been configured beforehand to know the network address of this synchronization server 30, in order to be able to transmit to it a signaling message containing the message SMS1, and also to determine whether it is necessary, or not, to trigger the transmission of this message SMS1 to this synchronization server 30, typically depending on an identifier retrieved in the signaling message received from the routing gateway 50', and in particular on the identifier of the recipient terminal indicated in a field of the message SMS1.

Thus, when it receives a message SMS1 from the network node 40, the routing gateway 50' may then determine (step S120) whether this message SMS1 must also be transmitted to the synchronization server 30, in addition to being transmitted to the recipient terminal 20.

This determination step may be carried out depending on an identifier associated with the recipient terminal of the message SMS1 received from the network node 40, typically the MSISDN of the recipient terminal such as indicated in this message SMS1. In particular, the routing gateway 50' may check whether this identifier has been previously stored by the routing gateway 50' (or by querying a database, for example an HLR) as being the identifier of a terminal belonging to a multi-terminal system involving a plurality of terminals, i.e. to the identifier of a recipient terminal for which it is right to transmit messages to the synchronization server 30.

If the result of this determination turns out to be negative (for example in the case where the recipient terminal 20 is not part of a multi-terminal system previously declared to the routing gateway 50', and therefore its MSISDN identifier has not been stored beforehand by the gateway 50'), the method stops at this stage and only the recipient terminal 20 receives the message SMS1 (step S115) in the signaling plane, in a conventional manner.

If the result of this determination turns out to be positive (typically in the case where the recipient terminal 20 is part of a multi-terminal system and is associated with an identifier stored by the routing gateway 50' to signal that such is the case), the routing gateway 50' then transmits (step S130) this message SMS1 to the synchronization server 30, by inserting this message SMS1 into a signaling message conforming to a signaling protocol suitable for signaling exchanges between routing gateways and synchronization servers, here the MAP protocol (but it could also be a question of the OMA NMS protocol).

It should be noted here that this determination step S120 may take place either before or after the step S115 of transmission to the recipient terminal 120, insofar as this transmission S115, in the signaling plane, of the message SMS1 is systematically carried out in the present embodiment, whether the recipient terminal belongs to a multi-terminal system or not.

Once this message SMS1 has been received, the synchronization server 30 stores (step S140) this message SMS1, after having extracted it from the signaling message in which it was received, either within a storage module of this server, or in a database associated with this server.

At this stage, the associated terminals 20' and 20" may then retrieve the message SMS1, intended for the recipient terminal 20, from the synchronization server 30, by means of synchronization messages conforming to a synchronization protocol suitable for synchronization in client-server mode, such as IMAP, JMAP, OMA DS or OMA NMS, inter alia.

Thus, as regards the associated terminal 20', when this terminal 20' is to be synchronized, the synchronization server 30 retrieves the message SMS1 intended for the recipient terminal 20 and inserts it into a synchronization message SYNC'[SMS1] which it transmits to this terminal 20' (step S150'). The server 30 does the same for all the other associated terminals, in the present case here for the terminal 20" (step S150") to which it transmits a synchronization message SYNC"[SMS1] into which it has inserted the message SMS1.

These synchronization messages may be implemented in the form of a message containing an attribute into which the message SMS1 is inserted. It may in particular be a question of a pager-messenger message according to the REST NMS interface, containing an inline SMS object, in which the message SMS1 may be directly inserted into a "textContent" attribute, as illustrated in the example below:

```
<object>
  <attributes>
    <attribute>
      <name>Message-Context</name>
      <value>pager-message</value>
    </attribute>
    <attribute>
      <name>From</name>
      <value>tel:+19585550100</value>
    </attribute>
    <attribute>
      <name>To</name>
      <value>tel:+19585550210</value>
    </attribute>
    <attribute>
      <name>Date</name>
      <value>2013-11-12T08:38:10Z</value>
    </attribute>
    <attribute>
      <name>Direction</name>
      <value>In</value>
    </attribute>
    <attribute>
      <name>Content-Type</name>
      <value>text/plain</value>
    </attribute>
    <attribute>
      <name>TextContent</name>
      <value>The weather is nice today, let's go to the beach!</value>
    </attribute>
  </attributes>
  <flags>
    <flag>\Seen</flag>
  </flags>
</object>
```

These synchronization messages may also be implemented in the form of a message with a payload field containing an address allowing the message SMS1 to be subsequently downloaded (by GET request for example). In particular, it may be a question of a pager-messenger message according to the NMS REST interface, as illustrated by the example below:

```
<object>
   <attributes>
      <attribute>
         <name>Message-Context</name>
         <value>pager-message</value>
      </attribute>
      <attribute>
         <name>From</name>
         <value>tel:+19585550100</value>
      </attribute>
      <attribute>
         <name>To</name>
         <value>tel:+19585550210</value>
      </attribute>
      <attribute>
         <name>Date</name>
         <value>2013-11-12T08:30:10Z</value>
      </attribute>
      <attribute>
         <name>Direction</name>
         <value></value>
      </attribute>
      <attribute>
         <name>Content-Type</name>
         <value>text/plain</value)
      </attribute>
   </attributes)
   <flags>
      <flag>Seen</flag>
   </flags>
   <payloadPart)
      <contentType>text/plain</contentType)
      <size>49</size>
      <href>/nms/v1/myStore/tel%3A%2B1958555010/objects/old999/payloadParts/blob123</href>
   </payloadPart>
</object>
```

These synchronization messages may also be implemented in the form of a notification from the synchronization server, containing in its object a URL making it possible to directly download a "message SMS1" object, as illustrated by the example below, in which the element "old1000" at the end of the URL represents a unique identifier of this message:

their own respective memories, for consultation or restitution later by a user. Thus, at the end of this method, all the terminals associated with the recipient terminal 20 have access to the message SMS1 to be received by the recipient terminal 20, and also to information associated with this message, such as the time the message was sent, where the message was sent from, read status, reply indicator, etc. The

```
<nmsEvent>
   <newObject>
      <parentFolder>http://exempleAPI/nms/v1/MyStore/tel%3A%2B19585550100/folders/fId80</parentFolder>
      <resourceURL>http://exempleAPI/nms/v1/MyStore/tel%3A%2B19585550100/objects/oId1000</resourceURL>
      <lastModSeq>134</lastModSeq>
      <correlationId>cId67</correlationId>
   </newObject>
</nmsEvent>
```

The previous three examples are in XML format, but a JSON structure may be used as well.

The synchronization message SYNC'[SMS1] used to transmit the message SMS1 to the associated terminal 20' may be the same as the synchronization message SYNC" [SMS1] used to transmit the message SMS1 to the associated terminal 20", or even be a synchronization message of a different type but conforming to the same synchronization protocol, or else conforming to a different synchronization protocol. All these synchronization messages are transmitted in the data transport plane, and not in the signaling plane as would be the case if the message SMS1 were to be duplicated and transmitted to each associated terminal.

Each associated terminal 20' and 20" may then, after having respectively received these synchronization messages SYNC' and SYNC", extract therefrom the message SMS1 intended for the recipient terminal 20 and store it in user of a multi-terminal system therefore has access to the same message reception history, regardless of the terminal to which they have access.

Figure 3:
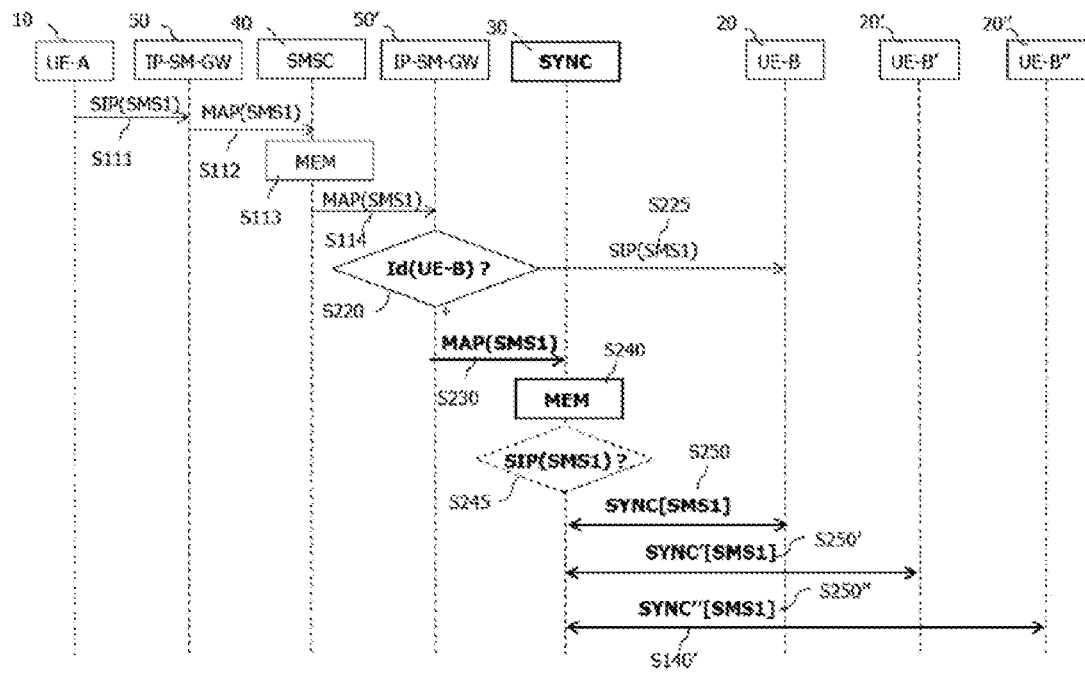
FIG. 3 shows another embodiment of the message transmission method according to the present invention.

Reference is now made to the FIG. 3, which illustrates a message transmission method according to another embodiment of the present invention.

This other embodiment is relatively similar to that illustrated in FIG. 2, with the difference being that after having received the message SMS1, the routing gateway 50' of the network to which the recipient terminal is subscribed does not necessarily transmit it directly to the recipient terminal, in the signaling plane, but may on the contrary leave it to the synchronization server to take care of it, in the data transport plane.

In other words, in the routing gateway 50', the conventional step (illustrated by S115 in FIG. 2) of transmitting the message SMS1 to the recipient terminal 20 according to a signaling protocol may be here inhibited, and therefore does not systematically take place.

To allow such inhibition, after having received a message SMS1 from the network node 40 (step S114), the routing gateway 50' may determine (step S220) whether this message SMS1 must be transmitted to the synchronization server 30, this determination possibly being carried out in a manner similar to step S120 described in relation to FIG. 2.

If the result of this determination turns out to be negative (for example because the recipient number MSISDN20 is not indicated, in the routing gateway 50', as being part of a multi-terminal system involving a plurality of associated terminals), the routing gateway 50' may then transmit (step S225) the message SMS1 according to a signaling protocol (here illustrated by the SIP protocol, but which may also be a combination of MAP and NAS protocols for example) suitable for signaling exchanges between network gateway and terminals, in a conventional way, without transmitting it in parallel to the synchronization server 30.

If the result of this determination turns out to be positive (for example because an identifier associated with the recipient terminal 20 is stored by the routing gateway 50' as indicating that this terminal 20 is part of a multi-terminal system involving a plurality of terminals), then there is no transmission of this message directly to the recipient terminal 20 in the signaling plane (i.e. step S225 is inhibited and does not take place), but on the contrary this message SMS1 is inserted into a signaling message conforming to a signaling protocol suitable for signaling exchanges between routing gateways and synchronization server (here the MAP protocol by way of example) and transmitted (step S230) to the synchronization server 30.

Preferably here, to signal to the synchronization server 30 that step S225 has been inhibited and therefore that it is up to the synchronization server 30 to allow the retrieval of the message SMS1 by the recipient terminal 20, the routing gateway 50' may insert into this signaling message an indicator, interpretable by the server 30, signaling that the message SMS1 has not been transmitted to the recipient terminal 20 by the gateway 50'.

Once this signaling message including the message SMS1 has been received, the synchronization server 30 extracts this message SMS1 and stores it (step S240), either within a storage module of this server, or in a database associated with this server.

At this stage, not only the associated terminals 20' and 20" but also the recipient terminal 20, may then retrieve the message SMS1, intended for the recipient terminal 20, from the synchronization server 30, by means of synchronization messages conforming to a synchronization protocol suitable for a client-server synchronization, such as IMAP, JMAP, OMA DS or OMA NMS, inter alia.

As in the embodiment illustrated in FIG. 2, as regards the associated terminal 20', the synchronization server 30 retrieves the message SMS1 intended for the recipient terminal 20 and inserts it into a second synchronization message SYNC'[SMS1] that it transmits to this terminal 20' (step S250'). It does the same for all the other associated terminals, in the present case here for the terminal 20" (step S250") to which it transmits a third synchronization message SYNC"[SMS1] into which it has inserted the message SMS1.

As regards the recipient terminal 20, in one embodiment, the synchronization server 30 may be configured to systematically retrieve the message SMS1 intended for this recipient terminal 20 and to insert it into a first synchronization message SYNC[SMS1] that it transmits to this terminal 20 (step S250), without taking into account a possible direct transmission to the terminal 20 of this message SMS1 in the signaling plan.

In one alternative embodiment, the method may comprise an optional step (step S245) of determination, by the synchronization server, in order to transmit a synchronization message SYNC[SMS1] to the recipient terminal 20 to determine only when it has not already been transmitted, in the signaling plane, by the routing gateway 50'. This determination may in particular be carried out by verifying the presence, in the signaling message received from the routing gateway 50' in step S230, of an indicator signaling that the message SMS1 has not been transmitted (or on the contrary, has been transmitted) to the recipient terminal 20 by the gateway 50'.

As for the embodiment illustrated in FIG. 2, the synchronization messages SYNC[SMS1], SYNC'[SMS1] and SYNC"[SMS1] used to transmit the message SMS1 respectively to terminals 20, 20' and 20" may be one and the same type of synchronization message, or indeed even be synchronization messages of different types but conforming to the same synchronization protocol, or indeed even respectively conforming to different synchronization protocols.

Each associated terminal 20, 20' and 20" may then, after having respectively received these synchronization messages SYNC' and SYNC", extract therefrom the message SMS1 intended for the recipient terminal 20 and store it in their own respective memories, for consultation or restitution later by a user. Thus, at the end of this method, all the terminals associated with the recipient terminal have access to the message SMS1 to be received by the recipient terminal, and also to information associated with this message, as described above.

In the embodiment illustrated in FIG. 3, only the data transport plane is used to broadcast the message to be received between the various terminals of the multi-terminal system, this allowing an optimal economy as regards resources in the signaling plane.

Figure 4:
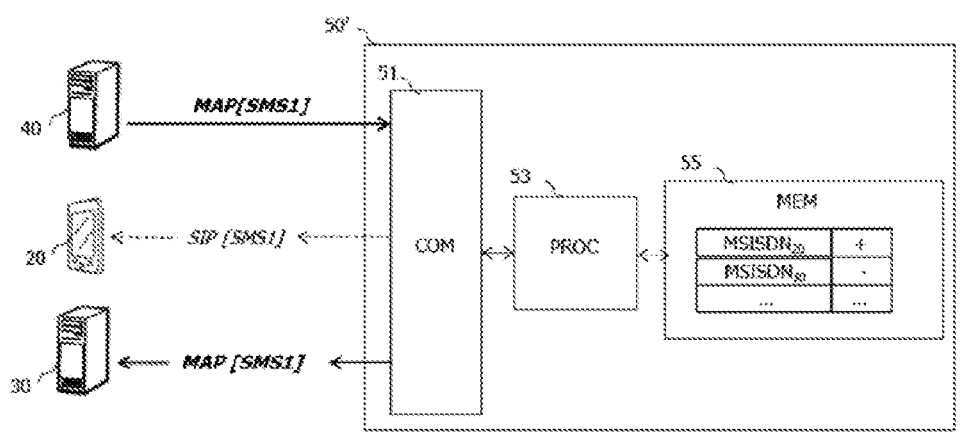
FIG. 4 illustrates a routing gateway according to one embodiment of the present invention.

Reference is now made to the FIG. 4, which illustrates a routing gateway according to one embodiment of the present invention.

This routing gateway 50' in particular comprises a communication module 51 (typically implemented in the form of a transceiver) configured to receive, from a network node 40 responsible for storing and transmitting messages in the signaling plane, a signaling message (illustrated by "MAP [SMS1]") conforming to a signaling protocol suitable for signaling exchanges between network node and routing gateway (here the MAP protocol) into which a message SMS1 to be transmitted to a recipient terminal 20 has been inserted.

This communication module 51 is also configured to transmit, to a synchronization server 30, a signaling message (illustrated by "MAP [SMS1]") conforming to a signaling protocol suitable for signaling exchanges between routing gateway and synchronization server (here also the MAP protocol) into which this message SMS1 has been inserted, and also possibly an indicator signaling the possible absence of transmission of this message SMS1 from this gateway directly to the recipient terminal 20.

In addition, in one particular embodiment, this communication module 51 is also configured to transmit, to the recipient terminal 20, a signaling message conforming to a signaling protocol suitable for signaling exchanges between routing gateway and terminals (here the SIP protocol, but it could also be the MAP or NAS protocol, for example) into which this message SMS1 has been inserted.

This routing gateway 50' further comprises a processing module 53 (typically implemented in the form of one or more processors executing computer program instructions stored by the routing gateway), configured firstly to process the signaling messages received from the network node 40, and in particular to extract therefrom a message SMS1 intended for a recipient terminal 20, for example an SMS message, when such a message has been inserted therein (this case being illustrated here in FIG. 4 by the message "MAP [SMS1]"). This message SMS1, once extracted from the signaling message "MAP [SMS1]", may be analyzed in order to retrieve an identifier associated with the terminal 20 for which it is intended (here its identifier "$MSISDN_{20}$").

Once this identifier has been retrieved, the processing module 53 may determine whether the recipient terminal 20 belongs to a multi-terminal system previously signaled to the gateway 50', by means of this identifier.

In order to perform this operation, in one embodiment, the processing module 53 interrogates a storage module 55 (typically a non-volatile memory, which is here illustrated as being comprised in the routing gateway 50', but which is also able to be implemented in the form of a database separate from this gateway, and to which this gateway has access) to verify whether this identifier is stored therein.

If the result of this determination turns out to be negative (i.e. the retrieved identifier "$MSISDN_{20}$" does not correspond to a stored identifier), the processing module 53 may then insert the message SMS1 into a signaling message according to a signaling protocol suitable for the terminals (here the SIP protocol, but it could also be a question of the MAP or NAS protocol, for example) and instruct the communication module 51 to transmit this signaling message to the recipient terminal 20, without soliciting the synchronization server 30.

If the result of this determination turns out to be positive (i.e. the retrieved identifier "$MSISDN_{20}$" corresponds to a stored identifier), the processing module 53 may then insert the message SMS1 into a signaling message suitable for exchanges with a synchronization server (here the MAP protocol) and instruct the communication module 51 to transmit it to the synchronization server 30.

Furthermore, in one particular embodiment, the processing module 53 may determine whether it is appropriate to insert this message SMS1 into a signaling message suitable for exchanges with terminals (e.g. the SIP, MAP or NAS protocol) and instruct the communication module 51 to transmit this signaling message directly to the recipient terminal 20, or on the contrary not to do so (in which case it is then up to the recipient terminal 20 to retrieve this message SMS1 directly from the synchronization server).

To determine whether this is so, a parameter indicative of a direct transmission to the recipient terminal, in the signaling plane, may be associated with the identifier signaling membership of the recipient terminal to a multi-terminal system, during the prior storage of this identifier by the routing gateway 50', in the storage module 55.

Thus, when the processing module 53 determines that the retrieved identifier is stored in the storage module 55 (and therefore that the recipient terminal belongs to a multi-terminal system), the processing module may also determine whether it is appropriate to transmit the message SMS1 directly to this recipient terminal 20, by verifying the presence of a parameter indicative of such direct transmission in the signaling plane.

By way of example, in FIG. 5, the identifier "$MSISDN_{20}$" is associated with the "+" parameter indicating that a direct transmission in the signaling plane is to be carried out. Conversely, the identifier "$MSISDN_{30}$" is associated with the "−" parameter indicating that a direct transmission in the signaling plane is to be inhibited, and therefore that the recipient terminal 30 must itself retrieve, from the synchronization server, the messages intended for it.

Thus, when the gateway 50' receives a message from which is retrieved the identifier "$MSISDN_{20}$" associated with a recipient terminal 20, the processing module 53 understands from what is stored in the storage module 55, not only that it is necessary to prepare one or more synchronization messages, including the message SMS1, to be transmitted to the terminals associated with the terminal 20, but also that it is necessary to prepare a signaling message including this message SMS1 to be transmitted to terminal 20.

In this case, the processing module may insert, into the signaling message intended for the synchronization server 30, an indication that this synchronization server does not need to send a synchronization message to the recipient terminal 20.

Conversely, when the gateway 50' receives a message from which is retrieved the identifier "$MSISDN_{30}$" associated with a recipient terminal 30, the processing module 53 understands from what is stored in the storage module 55, that it is only necessary to prepare one or more synchronization messages, including this message, to be transmitted to the terminals associated with the terminal 30, and that it is not necessary to prepare a signaling message including this message to be transmitted directly to terminal 30. In this case, the processing module may insert, into the signaling message intended for the synchronization server 30, an indication that this synchronization server must allow the recipient terminal 20 to retrieve the message SMS1, for example by inserting this message SMS1 into a synchronization message that it transmits to it.

If the indication mentioned in the two preceding cases is not inserted, it is then up to the recipient terminal 20 to detect that it has already received the message SMS1 directly, and therefore that it does not need to retrieve it from the synchronization server.

Furthermore, in the case of a common identifier corresponding to a native number of the recipient terminal 20, provision may be made (typically by the network operator) for the SMS messages sent to such a type of identifier to be always transmitted in the signaling plane, and therefore without retrieval from the synchronization server. The synchronization server may then be configured, by means of a global parameter, to apply such a network policy.

Reference is now made to the FIG. 5, which illustrates a synchronization sever according to one embodiment of the present invention.

This synchronization server 30 in particular comprises a communication module 31 (typically implemented in the form of a transceiver) configured to receive, from a routing gateway 50', a signaling message comprising a message SMS1 intended for a recipient terminal 20. This communication module is also configured to exchange synchronization messages with the one or more terminals 20', 20" associated with the recipient terminal 20, or even also with the recipient terminal 20 itself.

The synchronization server 30 further comprises a processing module 33, configured first of all to process the signaling messages received from the routing gateway 50', and in particular to extract therefrom a message SMS1 intended for a recipient terminal. 20, for example an SMS message, when such a message has been inserted therein (this case being illustrated here in FIG. 5 by the message MAP[SMS1]). Such a processing module is typically implemented in the form of one or more processors executing code instructions of a computer program, associated with a random-access memory and/or a read-only memory in which these code instructions are stored.

This message SMS1, once extracted from the synchronization message MAP[SMS1], may then be stored in a storage module 35 (typically a non-volatile memory), which is here illustrated as being comprised in the synchronization server 30, but which may also be implemented in the form of a database separate from this server, and to which this server has access to store these messages and subsequently access them.

This message may then be stored, in the storage module 35, in association with an identifier of the recipient terminal 20 (here, its identifier "$MSISDN_{20}$") in order to facilitate its subsequent retrieval.

When subsequently a terminal 20' associated with the recipient terminal 20 must be synchronized, the processing module 33 may then verify with the storage module 35 whether a message SMS1 associated with the unique identifier that is associated therewith has been stored and, if this is the case, the module 33 may then retrieve this message in order to insert it into a synchronization message SYNC'[SMS1] that it delivers to the communication module 31 so that the latter may transmit the synchronization message SYNC'[SMS1] to the associated terminal 20' in question. This operation is repeated for all the terminals associated with the recipient terminal 20, to be synchronized by means of the server 30 (here the terminal 20" also, to which the synchronization message SYNC"[SMS1] is transmitted). In one embodiment, this operation is also performed for the recipient terminal 20 when it may be synchronized by means of a message SYNC[SMS1] sent by the server 30.

The messages SYNC[SMS1], SYNC'[SMS1] and SYNC"[SMS1] may be sent spontaneously (i.e. without a prior request having been received to trigger sending of this message) by the synchronization server 30 to the terminals 20, 20' and 20", respectively, for example at regular intervals, in a push mode. Alternatively, these synchronization messages may be messages sent in response to synchronization requests received by the synchronization server 30 from the terminals 20, 20' and 20", respectively, in a so-called pull mode (such requests being illustrated by "REQ SYNC" in FIG. 5).

Reference is now made to the FIG. 6, which illustrates what is called an "associated" terminal, sharing the same identifier as another terminal, called the "recipient" terminal, which is the intended recipient of a message transmitted by a source terminal, according to one embodiment of the present invention.

This terminal 20' (which may in particular be a mobile terminal of smartphone type) in particular comprises a communication module 21' configured to receive, from a synchronization server 30 such as described above, a synchronization message SYNC'[SMS1] into which the message SMS1 intended for a recipient terminal 20 has been inserted. This communication module 21' may also be configured to send (for example, but not necessarily, at predefined intervals) the synchronization request "REQ SYNC" discussed previously to this synchronization server 30, with a view to triggering sending of the synchronization message SYNC'[SMS1] in return. Such a communication module may be implemented in particular in the form of a radio transceiver, e.g. of one or more radio antennas connected to a digital/analogue converter.

The terminal 20' further comprises a processing module 23' configured first of all to process the synchronization messages received from the synchronization server 30, and in particular to extract from such a synchronization message a message intended for another recipient terminal 20, for example a message of SMS format, when such a message has been inserted therein (this case being illustrated here in FIG. 5 by the message SYNC'[SMS1]). Such a processing module is typically implemented in the form of one or more processors executing code instructions of a computer program, associated with a random-access memory and/or a read-only memory in which these code instructions are stored.

This message SMS1, once extracted from the synchronization message SYNC[SMS1], may then be stored in a storage module 25' (typically a non-volatile memory) also comprised in the terminal 20'.

In particular, in the storage module 25' of the terminal 20', this message SMS1 extracted from the synchronization message may be stored with other messages $SMS_A$, $SMS_B$ (i.e. in the storage region associated with the same type of message in the terminal 20'), so that this message SMS1 may be accessed by the user in the same way as any other message of the same type received in a more conventional way (i.e. without use of a synchronization server).

Thus, in one embodiment in which the terminal 20' also comprises a user interface module 27', typically in the form of a touch screen, when the user consults their messages received from the mobile network (for example messages in SMS format), they will not only see the messages $SMS_A$ and $SMS_B$ received in a conventional way from the mobile network (i.e. without use of the synchronization server 30), but also the message SMS1 received from the synchronization server 30.

The module managing the user interface 27' (typically in software form) may optionally distinguish between (for example by means of different colours) these message $SMS_A$ and $SMS_B$, on the one hand, and SMS1 on the other hand, when they are displayed in order to notify the user to the difference in origin of these messages. Alternatively, this module presents these messages identically, so that the implementation of the present invention is transparent to the user, who sees only a series of messages of the same type, regardless of whether they have been received in the conventional way or through a synchronization with a synchronization server.

Of course, the invention is not limited to the exemplary embodiments described and shown above and on the basis of which it is possible to provide other embodiments and forms of implementation without otherwise departing from the scope of the invention.

In particular, SMS messages were discussed above by way of example of short messages that may advantageously be transmitted by virtue of the embodiments of the present invention. However, it may also be a question of any other type of relatively short message, the invention however being particularly advantageous when the size of the message to be transmitted is less than the size of the field available to insert it into a synchronization message between a terminal and a synchronization server, so that a single synchronization message is sufficient to transmit one (or even more than one) message(s) intended for a "recipient" terminal to another terminal associated with this recipient terminal.

In addition, the synchronization server presented above may be a specific piece of equipment, dedicated solely to the synchronization of messages with terminals associated with a terminal that is a recipient of messages, but also any piece of network equipment having other functionalities and in which a software module of "server" type is installed with a view to exchanging the synchronization messages SYNC presented above with a "client" type software module installed in terminals associated with the recipient terminal.

Although the present disclosure has been described with reference to one or more examples, workers skilled in the art will recognize that changes may be made in form and detail without departing from the scope of the disclosure and/or the appended claims.

The invention claimed is:

1. A method comprising:
transmitting a message intended for a first terminal, called a recipient terminal, from a second terminal, called a source terminal, to at least one third terminal, called an associated terminal, sharing a same identifier with the recipient terminal, the transmitting comprising, following reception of the message by a routing gateway:
transmitting, from the routing gateway to a synchronization server, the message by using a first signaling protocol;
retrieving, by said at least one associated terminal, the message intended for the recipient terminal from the synchronization server by using a first synchronization message; and
retrieving, by said recipient terminal, the message intended for the recipient terminal from the synchronization server by using a second synchronization message.

2. The method as claimed in claim 1, further comprising determining, by the routing gateway, a membership of the recipient terminal to a multi-terminal system comprising the recipient terminal and said at least one associated terminal, the retrieving by said at least one associated terminal_taking place only in the event of a positive result of said determining.

3. The method as claimed in claim 1, further comprising transmitting, from the routing gateway to the recipient terminal, the message by using a second signaling protocol.

4. The method as claimed in claim 3, wherein the transmitting, from the routing gateway to the recipient terminal, of the message by using a second signaling protocol is carried out only if it is determined, in the determining, that the recipient terminal does not belong to a multi-terminal system.

5. The method as claimed in claim 1, wherein the retrieving, by said recipient terminal, of the message intended for the recipient terminal from the synchronization server by using the second synchronization message is carried out only if it is determined that the message has not been transmitted from the routing gateway to the recipient terminal by using a signaling message.

6. The method as claimed in claim 1, further comprising storing, by the synchronization server, the message following reception of the message from the routing gateway.

7. An associated terminal, able to share a same identifier with another terminal, called a recipient terminal, the associated terminal comprising:
at least one processor; and
at least one non-transitory computer-readable medium comprising instructions stored thereon which when executed by the at least one processor, configure the associated terminal to:
receive a first message intended for said associated terminal, and store said first message intended for said associated terminal with a view to presenting it to a user;
further receive, from a synchronization server, a synchronization message containing a second message intended for the recipient terminal; and
extract, from the received synchronization message, the second message intended for the recipient terminal and to deliver said second message to a storage module in order to store said second message therein with a view to presenting the stored second message to a user with the first message intended for said associated terminal.

8. A method comprising:
transmitting a message intended for a first terminal, called a recipient terminal, from a second terminal, called a source terminal, to at least one third terminal, called an associated terminal, sharing a same identifier with the recipient terminal, the transmitting comprising, following reception of the message by a routing gateway:
transmitting, from the routing gateway to a synchronization server, the message by using a first signaling protocol;
retrieving, by said at least one associated terminal, the message intended for the recipient terminal from the synchronization server by using a first synchronization message; and
responsive to a positive determination that the recipient terminal does not belong to a multi-terminal system comprising the recipient terminal and said at least one associated terminal, transmitting, from the routing gateway to the recipient terminal, the message by using a second signaling protocol.

9. The method as claimed in claim 8, wherein the retrieving by said at least one associated terminal takes place only in the event of a positive determination that the recipient terminal belongs to a multi-terminal system comprising the recipient terminal and said at least one associated terminal.

10. The method as claimed in claim 8, further comprising storing, by the synchronization server, the message following reception of the message from the routing gateway.

* * * * *